United States Patent [19]

Seaborg

[11] Patent Number: 4,471,508
[45] Date of Patent: Sep. 18, 1984

[54] LINEARLY REVERSIBLE CASTER ASSEMBLY

[75] Inventor: Charles H. Seaborg, Seattle, Wash.

[73] Assignee: The Boeing Company, Seattle, Wash.

[21] Appl. No.: 392,404

[22] Filed: Jun. 25, 1982

[51] Int. Cl.³ .............................................. B60B 33/00
[52] U.S. Cl. .................................. 16/18 R; 16/31 A
[58] Field of Search ................. 16/18 R, 45, 20, 29, 16/31 R, 31 A, 38, 39, 42 R; 301/5 P, 125, 127

[56] References Cited

U.S. PATENT DOCUMENTS

| 1,343,758 | 6/1920 | Austin | 16/18 R |
| 1,839,396 | 1/1932 | Kimball | 16/18 R |
| 2,698,454 | 1/1955 | Meyer | 16/31 R X |
| 3,239,872 | 3/1966 | Kitrell | 16/18 R |
| 3,537,721 | 11/1970 | Warner | D8/375 X |

FOREIGN PATENT DOCUMENTS

| 1805607 | 9/1970 | Fed. Rep. of Germany | 16/45 |
| 469888 | 4/1914 | France | 280/5 R |
| 83602 | 6/1980 | Japan | 16/45 |
| 693320 | 6/1953 | United Kingdom | 340/611 |

Primary Examiner—Fred A. Silverberg
Attorney, Agent, or Firm—William C. Anderson

[57] ABSTRACT

A linearly reversible caster assembly (30) capable of carrying a load (L) on a surface (S) comprising a pivotable U-shaped frame (34) coaxially mounted with a caster wheel (32) on an axle (48). A translatable U-shaped frame (36), suitably attached to the load (L), has a planar surface (56) that coacts with a rollable surface (42) carried by the pivotable frame (34). The rollable surface (42) has a radius greater than the wheel (32) whereby when it is desired to reverse the direction of travel of the load (L), and thus the assembly (30), the frame (34) will pivot about the axle (48) and the wheel (32) will remain substantially motionless. As a result, the eccentricity of the caster assembly (30) is changed and the wheel (32) is linearly reversed.

8 Claims, 7 Drawing Figures

LINEARLY REVERSIBLE CASTER ASSEMBLY

The Government has rights in this invention pursuant to Contract No. F04704-80-C-0029 awarded by the U.S. Air Force.

TECHNICAL FIELD

This invention relates to a wheel structure and more particularly to a caster assembly having a readily reversible wheel.

BACKGROUND OF THE INVENTION

A caster assembly is a wheel or a set of wheels mountable in a suitable frame, such as, e.g., a clevis-type or a U-shaped frame. The frame is free to swivel about a generally vertical axis, i.e., the castering axis, which is perpendicular to the axis of a rotation of the wheel but offset therefrom to create an eccentricity. Freedom of movement about the castering axis and a proper eccentricity allows a caster assembly to be self-steering, i.e., the assembly will move in the direction of a motive force or a steering force. Caster assemblies are typically used in supporting relatively light loads such as, e.g., furniture, or relatively heavy loads such as, e.g., trucks and various portable machines.

In reversing the direction and thus the eccentricity of a conventional caster assembly, its caster wheel must rotate or swivel 180° about the castering axis inducing lateral movement of the assembly and consequently any load being supported. This swiveling of the caster wheel requires additional force and motion which may be undesirable under certain circumstances. Furthermore, highly loaded caster wheels do not rotate very easily about the castering axis.

Certain caster assemblies are linearly reversible, i.e., the caster wheels need not swivel about the castering axis as the eccentricity of the assembly is changed thereby allowing the load carried by the assembly to be readily moved in a forward or a reverse direction. Such assemblies are exemplified by U.S. Pat. No. 1,829,396 issued Jan. 5, 1932 to Kimball and U.S. Pat. No. 1,343,758, issued June 15, 1920 to Austin.

Unfortunately, the caster assembly of Kimball induces frictional forces tending to preclude reliable rectilinear reversal of the motion of the caster wheel. Under such circumstances, there may be some lateral movement of the caster assembly making it difficult to roll the loaded caster assembly out of constrained locations.

The caster assembly of Austin causes the load supported by the assembly to be slightly elevated as the caster wheel reverses direction which may be undesirable under certain circumstances. Also, the frictional forces associated with the Austin assembly may preclude linear reversal of its caster wheel.

Finally, neither the caster assembly of Kimball nor the caster assembly of Austin appears to be intended to support heavy loads. Where reliability of reversal, rectilinear translation of the load during reversal and high load-carrying capabilities are required, prior art caster assemblies, represented by Kimball and Austin, may be inadequate.

SUMMARY OF THE INVENTION

An object of the present invention is to provide a new and improved caster assembly.

Another object is to provide a caster assembly having a wheel capable of reliably reversing without pivoting about the castering axis.

A further object is to provide an improved caster assembly capable of carrying a relatively heavy load wherein the caster wheel is reversed without vertically or laterally displacing the load.

Briefly, the present invention provides a caster assembly having a wheel mounted for rotation about an axis. A means defining a translatable surface is positioned proximate the axis and a means defining a rollable surface is pivotably mounted about the axis. The rollable surface has a radius of curvature greater than the radius of the wheel and is capable of rollingly contacting the translatable surface whereby the wheel may be readily and linearly reversed.

DETAILED DESCRIPTION OF THE INVENTION

Figure 1:
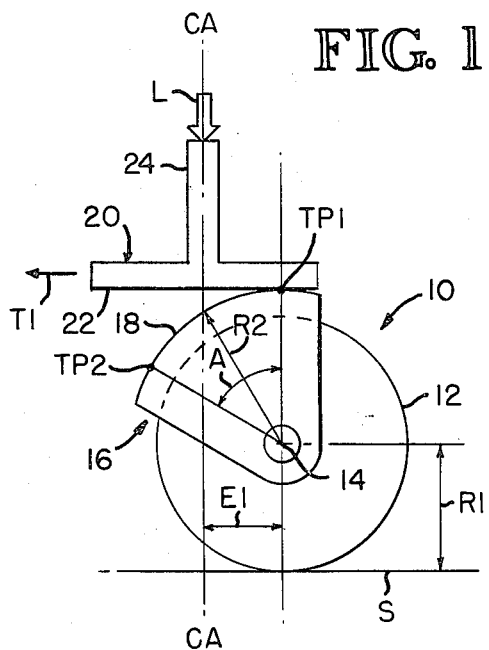
FIGS. 1 and 2 are extremely simplified side elevational views illustrating the principles of operation of the caster assembly of the present invention.
Figure 2:
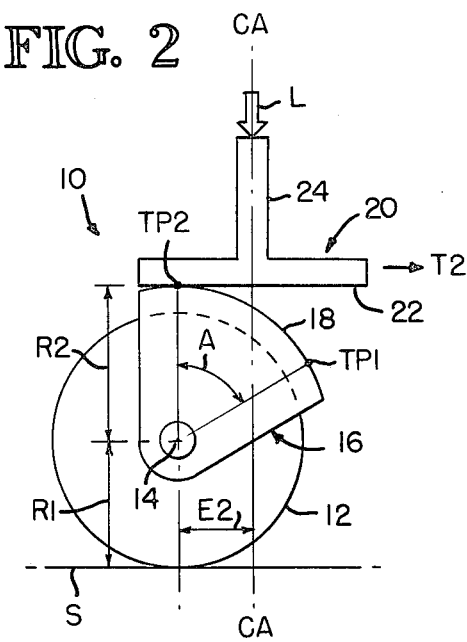

In FIGS. 1 and 2 a load L is shown as being carried or transported over a surface S by means of a caster assembly 10 of the present invention. The assembly 10 has been simplified to illustrate the basic principle of the present invention and comprises a roller or a wheel 12 mounted about a horizontal axis 14. A pivotable yoke member 16 is also mounted about the axis 14 and has a rollable, partial cylindrical surface 18 defined thereon. A translatable member 20, capable of moving along a plane parallel to the surface S, is provided with a planar surface 22 that rides on the rollable surface 18. The member 20 is also provided with an extension or a stem 24, disposed along the vertical castering axis CA of the assembly, and suitably connected to the load L by means of conventional axial and thrust bearings (not shown).

A caster assembly of the present invention is based upon the well-known principle that a body rolling on a surface experiences an increase in rolling resistance (friction) with that surface as the radius of the body decreases. In the present invention, the wheel 12, which shares a common axis 14 with the rollable surface 18, has a radius R1 which is less than the radius R2 of the rollable surface 18. Consequently, the rolling resistance generated between the wheel 12 and the surface S is greater than the rolling resistance generated between the rollable surface 18 and the planar surface 22.

As an example of the operation of the present invention, assume that FIG. 1 represents the moment when it is desired to reverse the direction of travel of the load L from a direction T1 to a direction T2 (see FIG. 2). Asume further that the assembly has an initial eccentricity E1, i.e., the castering axis CA is offset from the wheel axis 14 as shown in FIG. 1. Finally, assume that the translatable member 20 tangentially contacts the rollable surface 18 at a point TP1, during travel along T1, and a point TP2 during travel along T2.

Lines passing through TP1, TP2 and the axis 14 define a sector of a circle having its center at the axis 14 and its outer extremity at the rollable surface 18, as shown in FIGS. 1 and 2. An angle A, subtended by the sides of each sector, acts as a means of defining the extent of the pivotable motion of the yoke member 16 and thus the eccentricity of the caster assembly 10.

To reverse the wheel 12, the load L and the translatable member 20 are moved to the right, as viewed in FIGS. 1 and 2, i.e., in the direction of T2. Concomitantly, the surface 18 will roll on the planar surface 22 as the pivotable member 16 rotates clockwise about the axis 14. Furthermore, the point of tangency will move from TP1 towards TP2. The wheel 12 will roll or rotate very little about the axis 14 because its rolling resistance is greater than the rolling resistance of the surface 18.

When the pivotable member 16 has fully rotated, as shown in FIG. 2, the caster assembly 10 will have completely reversed without swiveling or pivoting of the wheel 12 about its vertial axis CA, i.e., there will be no lateral movement of the assembly 10. Furthermore, there will be no vertical displacement of the load L during the reversal process. As a result, the caster assembly 10 will now have an eccentricity E2, thereby allowing ready translation of the load L in the direction T2 and proper castering of the assembly 10, i.e., the wheel 12 will be able to pivot, as needed, about its castering axis CA suring translation along T2. Finally, as will be clear to the skilled artisan, the pivotable yoke member 16 will have rotated through the angle A during the reversal process.

Figure 3:
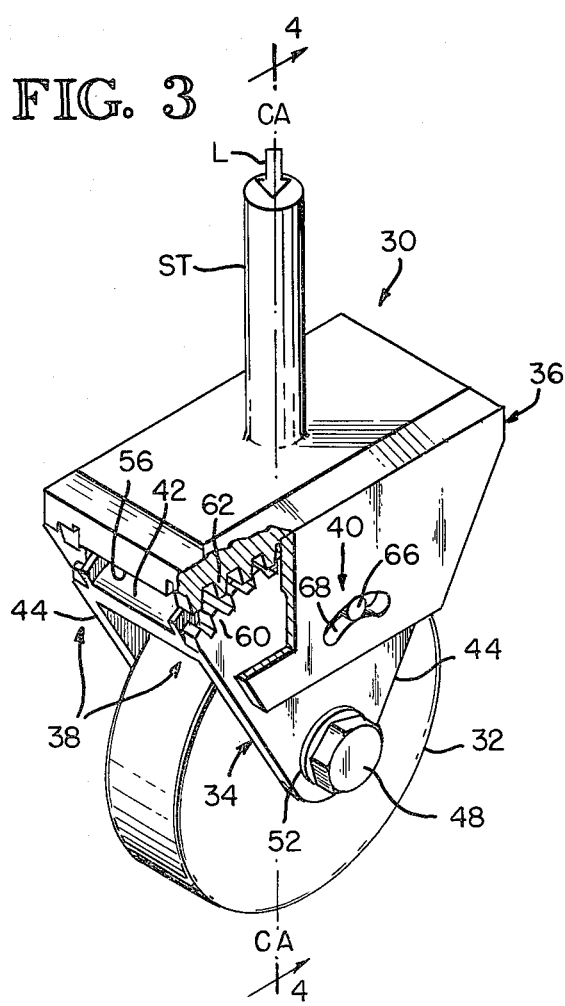
FIG. 3 is a perspective view, with parts broken away, of a preferred embodiment of the present invention.

Referring now to FIG. 3, the preferred embodiment of the present caster assembly has been designated with the numeral 30. The caster assembly 30 is shown as having a wheel 32, a pivotable U-shaped frame 34, a translatable U-shaped frame 36, a coupling subassembly 38 and a retainer subassembly 40.

The pivotable frame 34 has an upper rollable surface 42 and a pair of downwardly disposed sides 44. The sides 44 are provided with bores or openings 46 whereby an axle 48 may freely pass therethrough allowing the wheel 32 to be coaxially mounted with the pivotable frame 34. A retaining nut 50 may be fastened at the end of the axle 48 and washers 52 may be utilized. Preferably, spacer washers 54 are disposed between the sides 44 and the wheel 32 in order to substantially eliminate any friction therebetween that would tend to prevent the frame 34 from pivoting.

The rollable surface 42 comprises a portion of a cylinder and has a radius greater than the radius of the wheel 32. The surface 42 is capable of rolling on a planar surface 56 formed on the translatable frame 36. The translatable frame 36 also comprises a pair of downwardly disposed skirts 58 which extend around the sides 44 of the pivotable frame 34, as shown in FIG. 4.

The forces from the load L are transmitted through a stem ST attached to the frame 36. The stem ST is aligned with the castering axis CA and is attached to the load L by conventional thrust and axial bearings (not shown).

Figure 4:
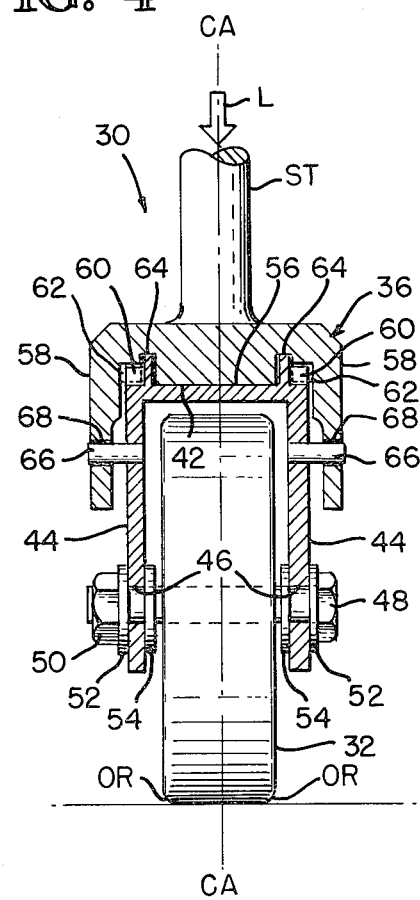
FIG. 4 is a cross-sectional view taken along line 4—4 in FIG. 3.

The coupling subassembly 38 comprises a plurality of gear teeth 60, acting as a pinion, formed on the upper rollable surface 42 and disposed on opposite sides of the castering axis CA of the assembly 30 (see FIG. 4). The gear teeth 60 cooperate with a plurality of gear teeth 62, acting as a rack, formed on the planar surface 56 of the translatable frame 36. The gear teeth 60, 62 of the subassembly 38 do not carry any loads from the load L supported by the caster assembly 30. The coupling subassembly 38 also comprises a pair of guides 64 which constrain the lateral (side-to-side) movement of the rollable surface 42 with respect to the planar surface 56 and prevent the introduction of friction between the gear teeth 60 and the inside surface of the skirts 58.

The gear teeth 60, 62 of the coupling subassembly 38 aid in maintaining the fore-and-aft relationship of the pivotable frame 34 with respect to the translatable frame 36 as the assembly 30 is translated along the surface S. The coupling subassembly 38 consequently helps to maintain a constant relationshhip between the rollable surface 42, the castering axis CA and the wheel axis passing through the axle 48. Further, if the assembly 30 is lifted off the surface S the gear teeth 60, 62 of the subaassembly 38 aid in preventing the frame 34 from pivoting into a position tending to retard or prevent a linear reversal of the wheel 32. Finally, the coupling subassembly 38 aids in limiting the pivotable motion of the frame 34, as will be obvious to the skilled artisan.

The retainer subassembly 40 comprises a pair of retaining pins 66 extending from each of the sides 44 into a corresponding pair of slots 68 formed within the skirts 58 of the translatable frame 36. The pins 66 freely move within the slots 68 and do not contact the interior surfaces of the slots 68 except under circumstances defined hereinafter. The shape of each of the slots 68 is a function of its location on the sides 44, the extent to which the frame 34 is allowed to pivot and the motion of the translatable frame 36. The shape of the slots 68 is simplified and the operation of the assembly is enhanced if the slots 68 are located along the centerline of the pivotable frame 34. Finally, the retaining subassembly 40 also aids in holding the gear teeth 60, 62 in a meshed condition if the assembly 30 and its load L are raised off the surface S. The retaining subassembly 40 thus cooperates with the subassembly 38 to help limit or prevent the pivoting of the frame 34 into a position tending to retard or prevent linear reversal of the wheel 32.

Figure 5:
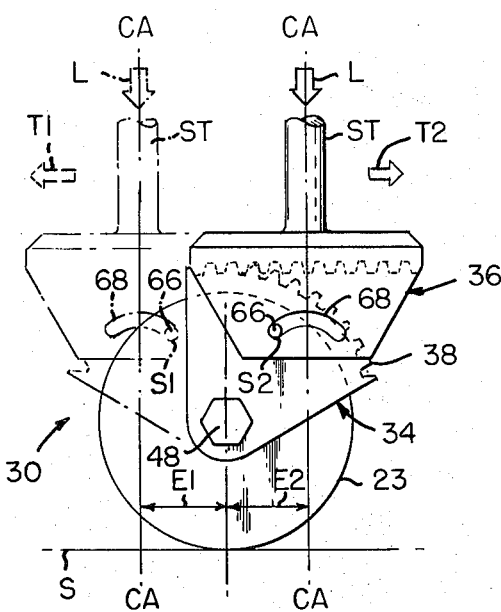
FIG. 5 is a side elevational view illustrating the operation of the embodiment of FIG. 3.

FIG. 5 shows the two normal conditions of the caster assembly 30. The phantom figure portion of FIG. 5 depicts the assembly 30 as it is traveling left along a direction T1, while the solid figure portion of FIG. 5 illustrates the assembly 30 as it is translating right; along T2. During motion along either T1 or T2 the wheel 32 may be castered or swiveled about the castering axis CA. To linearly reverse the assembly 30 from the left to the right as viewed in FIG. 5, the pivotable frame 34 must rotate clockwise through the angle A, defined earlier but not shown in FIG. 5 for clarity of illustration. This is accomplished by forcing the load and the translatable frame 36 to the right, i.e., along T2. Since the rolling resistance experienced by the rollable surface 42 is less than the rolling resistance experienced by the wheel 32, the frame 34 will pivot and the wheel 32 will remain substantially motionless. The extent to which the frame 34 pivots is limited by the coupling subassembly 38 and the retaining subassembly 40 as the motion of each of the retaining pins 66 is stopped by the extreme ends S1 or S2 of each of the slots 68 (see FIG. 5).

The subassembly 38, in conjunction with the pins 66 and the slots 68 will insure that the proper eccentricity will be obtained as the direction of movement of the caster assembly 30 is reversed. Stated another way, the present invention forces the castering axis CA to lead the wheel axis when the assembly 30 is translated in a particular direction whereby proper castering or swiveling of the wheel 32 is achieved. If this fore-and-aft relationship of the pivotable frame 34 is not maintained with respect to the translatable frame 36 then proper castering cannot be obtained.

As an option, the rolling face of the wheel 32 is rounded (as at OR in FIG. 4). The rounding of the wheel 32 makes it easier for the wheel to swivel during normal castering.

Figure 6:
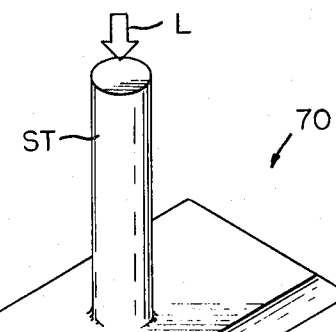
FIG. 6 is a perspective view, with parts broken away, of a second embodiment of the present invention.

A modified or a second embodiment of a caster assembly of the present invention is illustrated in FIG. 6 as an assembly 70. The coupling subassembly 38 of the caster assembly 70 comprises one set of gear teeth 60 and 62 formed on the surfaces 42 and 56, respectively. The gear teeth 60, 62 are located on the center line of the caster assembly 70 allowing the rest of the surface 42 to roll on the translatable surface 56. The sides 58 may act as lateral force transmitting guides during swiveling of the wheel 32 of the assembly 70.

Figure 7:
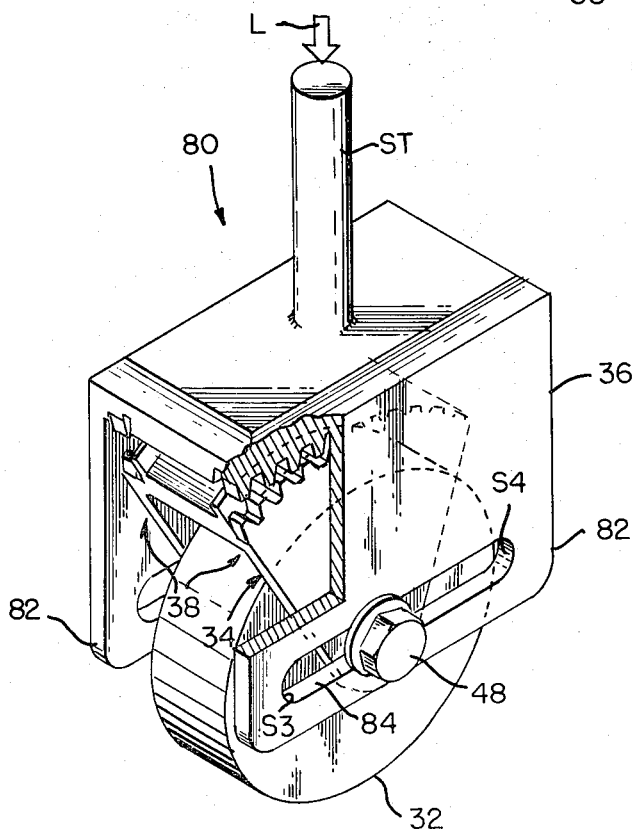
FIG. 7 is a perspective view, with parts broken away, of a third embodiment of the present invention.

A caster assembly 80 represents another modified or a third embodiment of the present invention. The assembly 80, illustrated in FIG. 7, comprises a wheel 32, a pivotable U-shaped frame 34, a translatable U-shaped frame 36 and a coupling subassembly 38. As can be seen in FIG. 7, the translatable frame 36 has side skirts 82 which extend down to the axle 48. The axle 48 travels freely within a slot 84 formed within each of the skirts 82 thereby forming a retaining subassembly.

The axle 48 does not touch the sides of the slot 84 except when it touches the ends S3, S4 of the slot 84 (i.e., at the end of the reversal motion). The coupling subassembly 38 and the ends S3, S4 thereby act as a stop and a limit on the pivotable motion of the frame 34. If the assembly 80 is raised off the surface S, the axle 48 and the slots 84 cooperate to maintain the proper relationships between the pivotable frame 34 and the translatable frame 36. The clearance between the axle 48 and the slots 84 is insufficient, however, to allow disengagement between the gear teeth 60 and the gear teeth 62. As the caster assembly 80 is linearly reversed, the axle 48 will move within each slot 84 (until stopped by the ends 53, 54) allowing the pivotable frame 34 to pivot about the axle 48 and the frame 36 to translate.

It should be emphasized that friction has been minimized as much as possible throughout the caster assembly of the present invention in order to enhance the reliability of the linear reversal of the wheel 32. For example, the coupling subassembly 38 comprises gear teeth 60, 62 which do not transmit loads and have a minimal amount of contact (except when acting as a stop in conjunction with the retainer subassembly 40 at the end of reversal). If there was load bearing contact (during reversal), friction could be induced within the coupling subassembly 38 thereby precluding pivoting of the frame 34 and rolling of the surface 42. Furthermore, care should be taken to reduce any physical contact between the guides 64 and the frame 36. Finally, the axle 48 passes, without touching, through the slots 84 in order to eliminate friction.

As will be clear to the skilled artisan, friction between the rollable surface and the translatable surface can also be controlled by conventional machining techniques. Consequently, even if a caster assembly of the present invention were to be used on an extremely smooth surface, e.g., a "mirror" surface, the caster wheel of the present assembly can still be made to reverse linearly.

Optionally, in an embodiment that is not illustrated herein, the rollable surface of the pivotable frame of the present invention may be spherical. The translatable frame would be provided with a corresponding cylindrical surface allowing the spherical surface to roll thereon. These cooperating surfaces of the pivotable and the translatable frames would enhance the load-carrying capability of the caster assembly of the present invention. This is due to the fact that a line contact between the spherical rolling surface and the translatable cylindrical surface is maintained even if a number of widely spaced apart caster assemblies are used to carry the load.

What is claimed and desired to be secured by Letters Patent of the United States is:

1. A caster assembly capable of linear reversal, comprising:
   a wheel mounted for rotation about an axis,
   translatable means capable of swiveling about a castering axis, said translatable means defining a planar surface positioned proximate said wheel axis, said planar surface being provided with two sets of gear teeth, said sets being disposed on opposite sides of a longitudinal plane that passes through said castering axis and is substantially perpendicular to said wheel axis, each set of said planar surface gear teeth extending along a plane that is substantially parallel to said longitudinal plane;
   pivotable means defining a rollable surface, said rollable surface forming a portion of a cylinder, said pivotable means being mounted about said wheel axis, said rollable surface having a radius, extending from said wheel axis, that is greater than the radius of said wheel, said rollable surface being capable of rolling on said planar surface and having two sets of gear teeth disposed thereon on opposite sides of said longitudinal plane and that are capable of freely coacting with one of said sets of said planar surface gear teeth, and
   a pair of guides on said pivotable means, said guides being disposed on opposite sides of said longitudinal plane, for constraining lateral movement of said rollable surface with respect to said planar surface.

2. The assembly of claim 1, further comprising means for limiting the pivoting of said pivotable means.

3. The assembly of claim 2, wherein said pivotable means comprises a substantially U-shaped pivotable frame.

4. The assembly of claim 3, wherein said translatable means comprises a substantially U-shaped translatable frame, said pivotable frame being nestled and freely pivotable within said planar frame.

5. The assembly of claim 4, wherein said limiting means comprises:
   a slot formed in said translatable frame, and
   a pin extending from said pivotable frame and being freely received within said slot.

6. The assembly of claim 5, wherein said wheel is rounded at its edges.

7. The assembly of claim 4, wherein said limiting means comprises:
   an axle extending along said axis and mounting said wheel,
   elongated slots formed within said translatable frame, said axle being capable of freely moving within said slots without contact with said slots.

8. The assembly of claim 7, wherein said wheel is rounded at its edges.

* * * * *